No. 844,552. PATENTED FEB. 19, 1907.
F. L. O. WADSWORTH.
METHOD OF MAKING GLASS SHEETS.
APPLICATION FILED AUG. 23, 1904.
2 SHEETS—SHEET 1.
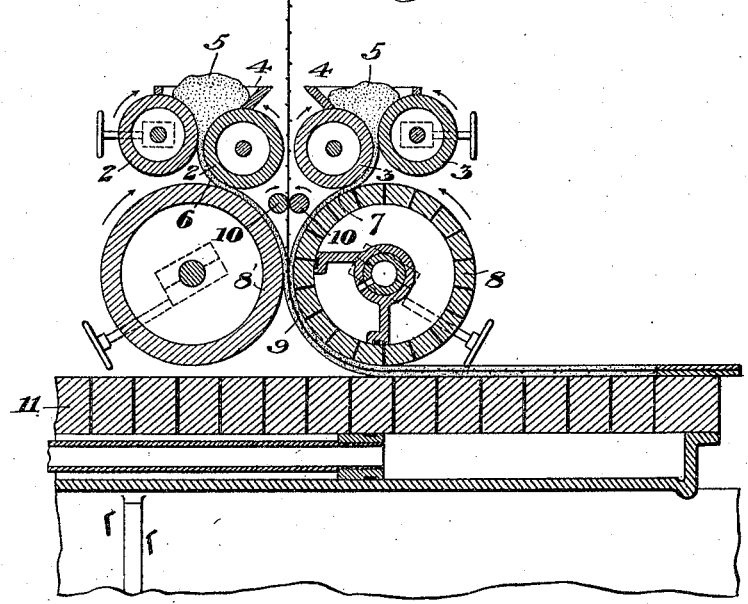
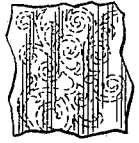
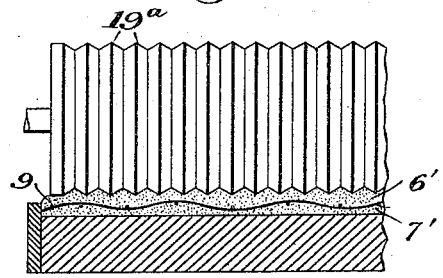
WITNESSES
Thomas W. Bakewell
Lindell A. Conner
INVENTOR
Frank L. O. Wadsworth No. 844,552.
PATENTED FEB. 19, 1907.
F. L. O. WADSWORTH.
METHOD OF MAKING GLASS SHEETS.
APPLICATION FILED AUG. 23, 1904.
2 SHEETS—SHEET 2.
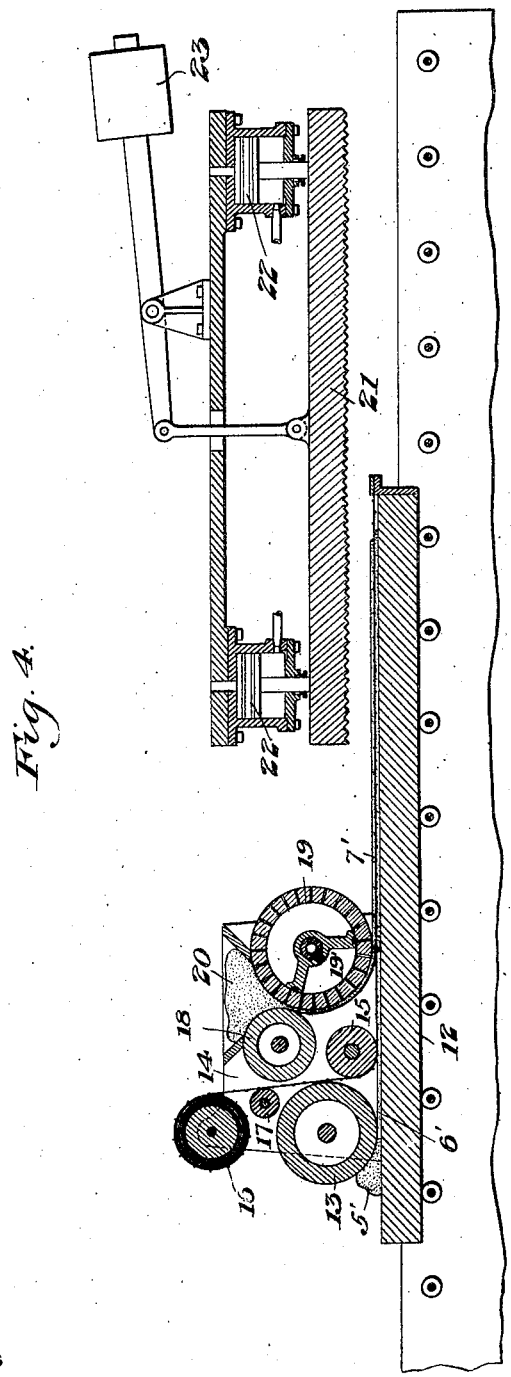
WITNESSES
INVENTOR

UNITED STATES PATENT OFFICE.

FRANK L. O. WADSWORTH, OF MORGANTOWN, WEST VIRGINIA, ASSIGNOR TO PRESSED PRISM PLATE GLASS COMPANY, OF NEW YORK, N. Y., A CORPORATION OF WEST VIRGINIA.

METHOD OF MAKING GLASS SHEETS.

No. 844,552.      Specification of Letters Patent.      Patented Feb. 19, 1907.

Application filed August 23, 1904. Serial No. 221,818.

*To all whom it may concern:*

Be it known that I, FRANK L. O. WADSWORTH, of Morgantown, Monongalia county, West Virginia, have invented a new and useful Method of Making Glass Sheets, of which the following is a full, clear, and exact description, reference being had to the accompanying drawings, forming part of this specification, in which—

Figure 1 shows in vertical section rolling apparatus suitable for the practice of my invention. Fig. 2 is a vertical cross-section of a table with a second sheet-forming roll having a fluted surface. Fig. 3 is a detail view illustrating open ornamental material which can be substituted in my invention for the wire fabric shown in Figs. 1 and 2 or may be used in conjunction therewith, and Fig. 4 is a longitudinal section of a modified apparatus in which the glass sheets are formed by rolls and a table.

My invention is a new method of making glass sheets, distinguished from prior methods in that I form two sheets of glass into sheet form while out of contact with each other and as they are formed bring their surfaces into contact, preferably upon an interposed material, but only after the sheets have been brought to sheet form, and then compressing the composite sheet by a pressure extending over substantially the entire surface area of the formed sheet, thus bringing all parts of the formed plate into intimate union with one another.

The advantages of the invention are that it enables the glass sheets to be rolled quickly and cheaply, and while securing a complete union of the two layers of the composite sheet it does so in such manner that the plane at which they are united is distinct and well marked. This enables me to secure ornamental effects, which have not been possible heretofore, and produces a better and more serviceable article.

In Fig. 1 I show mechanism in which both layers or sheets of the composite article are formed between rolls, each sheet having an individual pair of rolls by which it is rolled into sheet form and is delivered upon a third pair of rolls, where the two sheets are brought into contact and are united, preferably, upon an interposed mesh or interposed ornamental material. Such open material is illustrated in Fig. 3 and may consist of metal foil or the like shaped into an open and ornamental pattern. 2 2 and 3 3 are the pairs of rolls for forming the sheets initially out of contact with each other. Each may have a feed-hopper 4, into which a body of molten glass 5 is introduced, and as the glass passes from the hopper between the rolls it is reduced thereby into a sheet 6 or 7, and these two sheets pass thence between the surfaces of welding-rolls 8 8', where they meet an interposed wire fabric 9, fed into the pass of the rolls, preferably by feed-rollers 10. The glass sheets are thus brought together upon the interposed wire fabric and being still plastic are welded by the pressure of the rolls. The roll 8 is preferably constructed as shown and described by me in my Patent No. 798,642, issued September 5, 1905. The roll is hollow and is perforated at its circumference and revolves around a vacuum-chamber. This vacuum-chamber serves to hold the composite sheet as it is formed against the surface of the roll 8 until it reaches the table 11, upon which it is delivered. This table 11 is also preferably constructed with a vacuum-chamber and perforations extending from the top of the table into said vacuum-chamber and a stationary piston directly under the center of the roll 8.

As the table moves forward in the direction of the arrow, carrying on its upper surface the composite sheet of glass, the air is exhausted from the under side of the sheet, and the sheet is compressed against the table-surface by the pressure of the atmosphere on its upper surface. The pressure forces the layers of the glass sheet into intimate contact with each other and with the interposed mesh or fabric, forming a homogeneous and closely-united mass conforming perfectly in outline with the surface of the table on which it rests.

In the modification shown in Fig. 4 I employ a table 12 and a forming-roll 13 of usual construction, by which the first sheet or layer 6' is rolled from a body of molten glass 5'. This roll is mounted on a carriage 14, which also carries a roller 15 at the rear of the roll 13 and a roll 16, of wire fabric, which passes, preferably in contact with a suitable guiding-roller 17, under the roller 15, so that as the sheet 6' is formed by the roll 13 the following roll 15 flattens the wire-mesh upon its surface. The second layer 7' of glass is formed by rolls 18 19, which are also mounted upon the carriage 14 and are supplied with molten glass, preferably from a hopper 20, the periphery of the roll 19 extending nearly to the surface of the table 12. As the carriage moves along the table the second layer of glass 7' is formed by the rolls 18 and 19 and is delivered by the roll 19 upon the surface of the first sheet or layer 6' and is spread thereon and caused to weld thereto upon the interposed wire fabric by the action of the roll 19, which may be supplemented by other following rollers, if desired. In this Fig. 4 I show the roll 19 hollow and perforated at its circumference and revolves around a vacuum-chamber 19', which serves to hold the glass in contact with the surface of the roll until it is delivered in sheet form upon the table. After the composite sheet has thus been rolled out upon the table the latter, carrying with it the sheet of glass, is brought under a die 21, and the latter is forced down upon it by exhausting the air from underneath the pistons 22. This compresses the composite sheet of glass upon the table and brings about an intimate union between all parts of the same. At the same time the top surface may be shaped in any desired form by suitably figuring the die. After the pressing has been completed connection with the vacuum-pump is shut off and air admitted under the pistons and the die is raised by a counterweight 23.

In Fig. 2 I show a modified construction, in which the roll 19ª is fluted, so as to produce a glass sheet with a corrugated surface.

In all the forms of the apparatus which I have shown I may substitute for the wire-mesh the ornamental foil shown in Fig. 3, or I may feed such foil with the wire-mesh between the layers of glass. It produces a highly-ornamental effect, and as the layers are reduced to sheet form before they are brought into contact the foil will not be distorted in the operation, as it would be if it were interposed between layers of glass one of which is brought into sheet form on the other while it is in contact therewith. Moreover, as the temperature of the glass layers at the time of their contact in my process is appreciably less than the temperature of the layers at the time of their individual formation I may use for the ornamental foil fusible material which could not otherwise be interposed without destroying or spoiling it. This is also of advantage with open-work metal of any character, as it prevents burning of the metal and the formation of gases, which produce bubbles in the glass.

The apparatus may be otherwise modified in other ways without departing from my invention, since

What I claim is—

1. The method of making glass sheets which consists in forming two sheets of glass out of contact with each other, and bringing their surfaces into welding contact upon interposed open material only after they are brought to sheet form and while they are still plastic, and then subjecting the compound sheet to pressure acting upon the entire cross-section of the sheet between the pressure-applying surfaces; substantially as described.

2. The method of making glass sheets which consists in forming two sheets of glass out of contact with each other, and bringing their surfaces into welding contact upon interposed open material only after they are brought to sheet form and during the formation of subsequent portions of the same sheet or sheets and then subjecting the compound sheet to pressure acting upon the entire cross-section of the sheet between the dies; substantially as described.

3. The method of making glass sheets which consists in forming two sheets of glass out of contact with each other and bringing their surfaces into welding contact with each other only after they are brought to sheet form and while they are still plastic, and then compressing the composite sheet between extended die-surfaces which act upon the entire cross-section of the sheet between such surfaces; substantially as described.

4. The method of making glass sheets, which consists in forming two sheets of glass out of contact with each other and bringing their surfaces into welding contact with each other upon interposed metal mesh only after they are brought to sheet form and when their temperature has been appreciably reduced, and then compressing the composite sheet over substantially its entire surface; substantially as described.

In testimony whereof I have hereunto set my hand.

FRANK L. O. WADSWORTH.

Witnesses:
GEO. B. BLEMING,
THOMAS W. BAKEWELL.